United States Patent
Gorgone et al.

[15] 3,646,313
[45] Feb. 29, 1972

[54] TEMPERATURE CONTROLLED FLOW CELL

[72] Inventors: Robert L. Gorgone; Robert J. Emary, both of Oberlin, Ohio

[73] Assignee: Gilford Instrument Laboratories Inc., Oberlin, Ohio

[22] Filed: Apr. 8, 1970

[21] Appl. No.: 26,510

[52] U.S. Cl. .................................. 219/200, 219/209, 219/505, 219/510
[51] Int. Cl. ........................................................... H05b 1/00
[58] Field of Search ............... 219/200, 201, 209, 210, 504, 219/505, 510; 73/23.1; 168/27; 356/181

[56] References Cited

UNITED STATES PATENTS

| | | |
|---|---|---|
| 3,159,996 | 12/1964 | Norem...................................73/23.1 |
| 3,143,167 | 8/1964 | Vieth......................................165/27 |
| 3,057,183 | 10/1962 | DeFord..................................73/23.1 |
| 3,440,397 | 4/1969 | Vesper et al..........................219/209 |
| 3,159,020 | 12/1964 | Donner et al.........................73/23.1 |

*Primary Examiner*—C. L. Albritton
*Attorney*—Silverman & Cass

[57] ABSTRACT

A fluid sample flow cell is constructed with a thermistor junction intimately positioned next to the sample analysis chamber which is in a cell block that has high-thermal conductivity and is provided with electrical heating elements. Electronic controls coupled to the thermistor junction and heating elements enable the fluid sample to be maintained at a precisely regulated temperature.

14 Claims, 2 Drawing Figures

PATENTED FEB 29 1972 3,646,313

Inventors
ROBERT J. EMARY
ROBERT L. GORGONE
BY
*Silverman & Cass*
ATTYS.

TEMPERATURE CONTROLLED FLOW CELL

CROSS-REFERENCE TO RELATED APPLICATION

This invention is an improvement to the invention disclosed and claimed in copending U.S. application Ser. No. 589,935 filed Oct. 27, 1966 and assigned to the assignee of this application. To the extent they may be found necessary, said copending application is incorporated herein.

BACKGROUND OF THE INVENTION

This invention relates to fluid sample flow cells constructed to receive successive sample of fluids, such as enzymes, for examination by radiant energy measuring equipment, as in spectrophotometry. More particularly, the invention relates to an electrically heated and monitored flow cell capable of maintaining small samples of fluid at precise temperatures, independent of changes in the ambient temperature.

In the cited copending application, there is disclosed a flow cell having a specially formed flow path, especially at the input and outlet ends of the otherwise cylindrical sample examining chamber. The features of the present invention are arranged, for the most part, to cooperate with and be housed within the cited flow cell.

It is well known in the prior art to control the temperature of a flow cell by surrounding the cell with a water bath or jacket or other form of heat transfer element. Because of heat losses between the water bath and the sample chamber which vary due to changes in ambient conditions, and because of inadequate monitoring of the temperature of the sample fluid in the analysis chamber, the prior art temperature control lacked precision. Moreover, such devices were bulky, somewhat expensive and were frequently in need of maintenance because of mineral deposits in and evaporation of the water supply.

SUMMARY OF THE INVENTION

Accordingly, it is a primary object of this invention to provide a compact, especially precise, electrically operated temperature sensing and controlled heating arrangement for a fluid sample flow cell.

To achieve the above and other objects of this invention and to overcome the deficiencies of the prior art, a flow cell is provided with a thermistor junction position especially close to the fluid analysis chamber. Electrical heating elements are mounted within the cell block, which is of high-thermal conductivity. The thermistor is part of an electrical bridge, the unbalance of which determines the change in the amount of power delivered to the heating elements. BRIEF DESCRIPTION OF THE DRAWING FIG. 1 is a perspective view of the improved flow cell taken along a vertical midsection; and FIG. 2 is a block diagram of the subject electrical control elements.

DESCRIPTION OF THE PREFERRED EMBODIMENT

Figure 1:
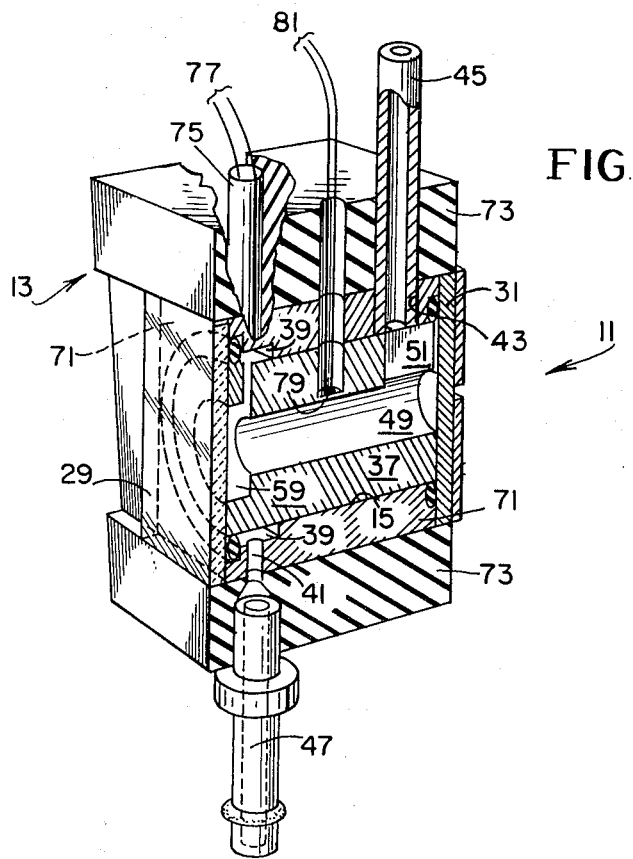
Figure 2:
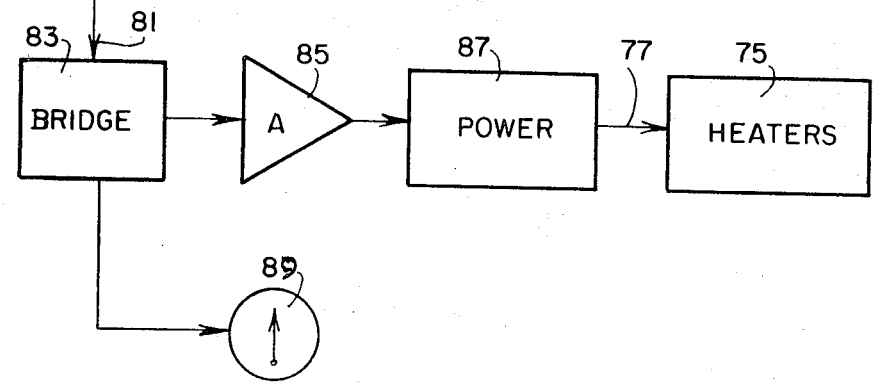

Inasmuch as FIG. 1 is substantially the same as FIG. 2 of the cited copending application, except for the improvements of this invention, the previously disclosed structural elements, their interrelationships, purposes and functions will not be discussed herein; only the following tabulation of significant elements will be set forth;

- 11 - fluid flow cell
- 13 - cell body or block
- 15 - cylindrical bore in body 13
- 29,31- windows
- 37 - insert
- 39 - coaxial well
- 41 - exit port
- 43 - entrance port
- 45 - inlet tube
- 47 - outlet tube
- 49 - passageway for defining the fluid analysis chamber
- 51 - elongated entrance slot
- 59 - transverse channel It should be appreciated that FIG. 1 is magnified several times greater than a commercial embodiment, in which the length of the fluid analysis chamber 49 is 10 millimeters and the contents thereof is nominally one-half milliliter.

Hand-in-hand with the need for precise temperature regulation of the test samples is the fact they many of the test samples are corrosive or may be affected by metallic ions. Although the insert 37 was preferably a fluoroethylene polymer in the copending application and such is suitably corrosion resistant, its thermal conductivity is not of such level to be an asset for the present invention. Accordingly, the insert 37, as well as the portions of the inlet and outlet tubes 45 and 47 that come in contact with the sample fluid are preferably "inert" stainless steel. Additionally, the cell block body 13 now comprises two portions -- an inner portion 71 of high-thermal conductivity material, such as aluminum, and an outer portion 73 of insulation material. Hence, the cell body has a pair of abutting parts 37 and 71 of high-thermal conductivity.

Mounted within the body 13 and particularly in the inner portion 71 are electrical heaters 75, one of which is illustrated. Power thereto is applied by way of leads 77. The orientation, size, shape and heating capacity of the heaters depend upon the construction of the cell, the required sample temperature and ambient conditions. It has been found suitable to employ a pair of cylindrical, cartridge-type heater elements, one on each side of the passageway, proximate its midsection.

Secured within the stainless steel inert 37 at a position almost touching the passageway 49, and thereby as close as possible to the fluid sample, is a thermistor bead or junction 79, having electrical leads 81. The position of the temperature sensing thermistor junction 79 causes it to be especially responsive to the temperature of the fluid sample, while not being adversely influenced by the temperature of the insert 37. Thermal isolation between the thermistor bead and the insert can be achieved by insulating means, not shown, which surrounds the thermistor bead except at its surface of contact with the insert just adjacent the passageway 49.

Turning to FIG. 2, an electrical bridge 83 has one arm that contains the thermistor and receives the output from the thermistor bead 79 via the leads 81. The balancing arm of the bridge, opposite the thermistor, contains calibrated precision resistors matching the characteristics of the thermistor at selected control point temperatures. Unbalance of the bridge is applied to an operational amplifier 85 which drives a power applying means 87, such as a series connected transistor, which in turn is connected by the leads 77 t' the heater elements. A null meter 89 monitors the resistances of the thermistor and the precision resistors to provide operation control. Initial deviations from null balance can be corrected by preadjustment by the human operator or, if desired, fed into servo control means, not shown, to alter the drive power to the heaters to bring the system to null balance. Such preadjustment can be applied to the amplifier 85 as a bias signal for summing therein.

In operation, the bridge 83 is preset to be balanced at a precise temperature of the fluid sample and the chamber 49. The thermistor bead reports the sample temperature to the bridge and any deviation or unbalance causes a change in the amount of power applied to the heaters 75, to thereby remove the unbalance. The high-thermal conductivity of the insert 37 and the inner body portion 71, combined with the sensing position of the bead 79, has enabled the embodied invention to maintain sample temperature within one-tenth a degree of the control point; hence, not only are temperature changes precisely monitored, but correction is both precise and rapid.

Although the primary features of this invention have been disclosed in a preferred embodiment, as in combination therewith, these primary features by themselves define a subcombination useful in other forms of flow cells and similar apparatus, where precise temperature control, low cost, and compactness of installation are criteria, and those skilled in the art will appreciate that variations may be made therein without departing from the spirit and scope of the invention.

What is sought to be protected by United States Letters Patent is:

1. A temperature control arrangement for apparatus of the class described, in which the temperature of an enclosed body of sample material is to be precisely maintained by the application of heat, said arrangement comprising:
   a solid body of high-thermal conductivity defining an analysis chamber substantially surrounding the enclosed body of sample material and having inlet and outlet ends,
   electrical heating means mounted within said body of high-thermal conductivity, yet relatively remote from said analysis chamber.
   electrical temperature sensing means mounted within said solid body of high-thermal conductivity and positioned intimate with the sample material and relatively remote from the heating means in such manner relative to the sample material and said heating means as to be responsive primarily to the temperature of the sample material rather than the heat produced by said heating means, and
   electrical control elements for comparing the temperature measured by said sensing means with a preset temperature value desired for the sample material and for applying energizing power to said heating means proportional to the output from said comparing means.

2. An arrangement according to claim 1 in which said solid body of high-thermal conductivity comprises
   a first part which defines said analysis chamber, and
   a second part substantially encompassing said first part,
   said sensing means being mounted within said first part, and said heating means being mounted substantially within said second part.

3. An arrangement according to claim 2 in which said first and second body parts define in said apparatus:
   a flow through path through said analysis chamber,
   a channel at the outlet end of said analysis chamber, and
   a well coaxial with the outlet end of said analysis chamber,
   said channel providing the only sample flow communication between said chamber and said well, and said well providing the only sample outlet from said apparatus.

4. An arrangement according to claim 2 in which
   insulating means substantially encompasses said second part of said body of high-thermal conductivity.

5. An arrangement according to claim 2 in which said first part is of corrosion resistant material.

6. An arrangement according to claim 2 in which
   said first part is in the form of an insert,
   said analysis chamber is elongated along an axis, and
   an elongated entrance is defined by said first part, with the dimension of elongation of said entrance being parallel to the axis of said analysis chamber.

7. An arrangement according to claim 2 in which
   said sensing means comprises a thermistor junction and
   said heating means comprises an electrically powered heater cartridge.

8. An arrangement according to claim 2 in which said electrical control elements comprise
   electrical bridge means connected to be balanced at the preset temperature value and to be unbalanced upon receipt from said sensing means of sample material temperature different from the preset value.

9. An arrangement according to claim 8 in which said control elements further comprise
   electric power applying means coupled between said bridge means and said heating means, and
   bridge balance monitoring means coupled to said bridge for surveillance of the operation of the temperature control by said arrangement.

10. A temperature controlled flow cell comprising:
    a first flow cell body part of high thermal conductivity constructed to define a fluid sample analysis chamber having input and exit ends,
    electrical heating means mounted so as to apply heat of variable quantity to said analysis chamber, and
    a temperature sensor mounted within said first body part especially close to said analysis chamber and relatively remote from said heating means,
    said sensor constructed and arranged to transmit an electric signal proportional to the temperature of said analysis chamber and, because of the relative positions of said sensor, chamber, and heating means, substantially independent of the temperature of said first body part.

11. A flow cell according to claim 10 which further comprises a second body part providing therein mounting means for said heating means,
    said second body part being oriented about said first body part in surface contact therewith and extending outwardly therefrom as a solid body of high-thermal conductivity.

12. A flow cell according to claim 11 in which
    said analysis chamber is cylindrical,
    a coaxial well surrounds the exit end and provides the only a transverse channel is at said exit end and provides the only flow path between said analysis chamber and said well, and
    an exit port is exclusively connected to said well to receive material from said flow path.

13. A flow cell according to claim 12 which further comprises electrical control means for receiving the electrical signal from said sensor and for supplying a varying amount of power to said heating means dependent upon a comparison of said electrical signal and an electric value proportional to the desired temperature of said analysis chamber.

14. A flow cell according to claim 12 in which
    said sensor comprises a thermistor bead, and
    said electrical control means comprises an electrical bridge which is connected to balance said electrical signal from said thermistor bead with the electric value of the desired temperature.

* * * * *

PO-1050
(5/69)

UNITED STATES PATENT OFFICE
CERTIFICATE OF CORRECTION

Patent No. 3,646,313                          Dated February 29, 1972

Inventor(s) ROBERT L. GORGONE and ROBERT J. EMARY

It is certified that error appears in the above-identified patent and that said Letters Patent are hereby corrected as shown below:

Column 1, line 43, change "position" to --positioned--; column 2, line 6, change "they" to --that--, line 28, change "inert" to --insert--, line 48, change "t'" to --to--, line 59, after "bead" insert --79--; column 4, line 37, delete "and provides the only" and insert --of said analysis chamber,--.

Signed and sealed this 22nd day of August 1972.

(SEAL)
Attest:

EDWARD M. FLETCHER, JR.
Attesting Officer

ROBERT GOTTSCHALK
Commissioner of Patents